(12) United States Patent
Itoh

(10) Patent No.: US 7,405,756 B2
(45) Date of Patent: Jul. 29, 2008

(54) IMAGE PICKUP APPARATUS

(75) Inventor: Hiroshi Itoh, Hachioji (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 11/644,666

(22) Filed: Dec. 21, 2006

(65) Prior Publication Data

US 2007/0103571 A1 May 10, 2007

Related U.S. Application Data

(62) Division of application No. 10/154,656, filed on May 23, 2002, now abandoned.

(30) Foreign Application Priority Data

May 24, 2001 (JP) ............................. 2001-154805

(51) Int. Cl.
*H04N 9/64* (2006.01)
*H04N 5/208* (2006.01)
(52) U.S. Cl. ..................................... 348/246; 348/252
(58) Field of Classification Search ......... 348/241–247, 348/252; 382/266–270
See application file for complete search history.

(56) References Cited

U.S. PATENT DOCUMENTS 6,975,354 B2 * 12/2005 Glotzbach et al. ........... 348/273
7,009,644 B1 * 3/2006 Sanchez et al. ............. 348/247

* cited by examiner

*Primary Examiner*—Nhan T Tran
*Assistant Examiner*—Yogesh Aggarwal
(74) *Attorney, Agent, or Firm*—Straub and Pokotylo; John C. Pokotylo

(57) ABSTRACT

An image pickup apparatus including: CCD image pickup device; a light blocking plate for shutting out light incident upon the image pickup device; an exposure period controlling section for setting exposure time by controlling the light blocking plate and the image pickup device; a dark signal storing section for storing dark signals obtained from the image pickup device in a state where light is shut out by the light blocking plate; a subtracting section for subtracting the dark signals from main image pickup signals of the image pickup device; a defect detecting section for detecting defects from the subtracted image pickup signals outputted from the subtracting section; and a defect correcting section for performing correction of the detected fault pixels. It is thereby possible to achieve an image pickup apparatus capable of detecting and correcting at high accuracy those fault pixels occurring afterwards because of changes due to the passage of time or those fault pixels transiently occurring under certain modes.

6 Claims, 17 Drawing Sheets

FIG. 12
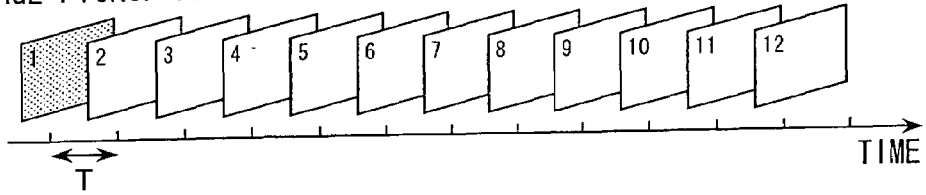
FIG. 13
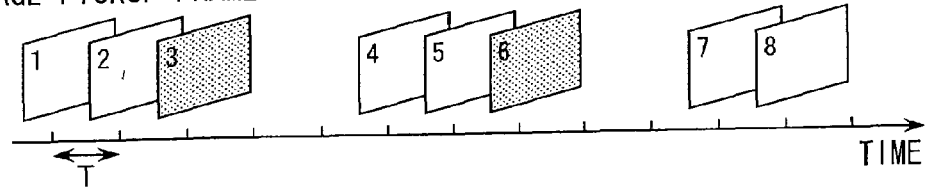
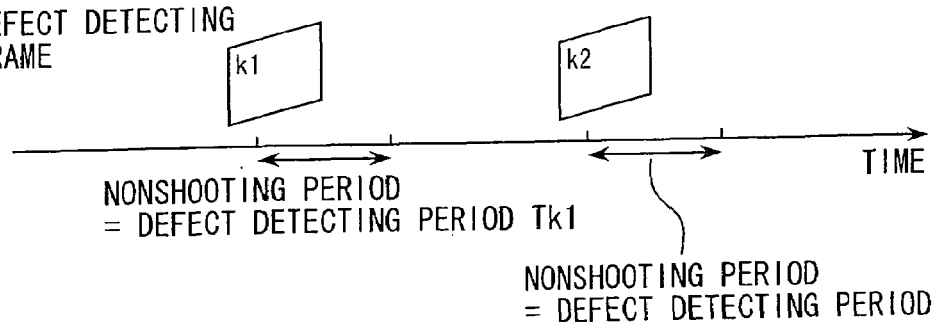

IMAGE PICKUP APPARATUS

This application is a divisional application of U.S. patent application Ser. No. 10/154,656 (titled "IMAGE PICKUP APPARATUS", filed on May. 23, 2002 now abandoned, listing Hiroshi Itoh as the inventor), which claims benefit of Japanese Application No. 2001-154805 filed on May. 24, 2001. The contents of both of these applications are incorporated by reference.

BACKGROUND OF THE INVENTION

The present invention relates to image pickup apparatus in which pixel defects occurring on image are adaptively detected and corrected in accordance with an image scene or an operating state of the apparatus.

The rate of occurrence of defect pixels, i.e., fault pixels is generally higher in such image pickup apparatus as a high-definition electronic camera where a solid-state image pickup device having a large number of pixels is used. Technology for the detection and correction thereof has become indispensable. The yield of solid-state image pickup device becomes higher and the price of the apparatus is greatly reduced by correcting pixels of singularities represented by these fault pixels.

The known technology for electrically correcting such fault pixels includes the following techniques. In particular, Japanese patent laid-open application 55-156482 for example discloses the technique of preparing a memory in which locations of fault pixels occurring peculiarly to each solid-state image pickup device are previously retained at the time of manufacturing the solid-state image pickup device. Such a memory is mounted on the image pickup apparatus such as an image sensor. While continuously surveying output signals from the memory, the fault pixels at the predetermined locations are interpolated for example by means of average values of adjoining pixels.

Further Japanese patent laid-open applications Hei-6-6685 and Hei-9-289614 for example disclose the technique of providing a mode to detect fault pixels under certain image pickup conditions for example at the time of introducing power or at the time of an adjustment involving the operation for shutting out light incident upon the solid-state image pickup device so that, though a memory is provided, information on the detected defects is updated at each occurrence of such certain image pickup conditions.

Further Japanese patent laid-open applications Hei-7-23297 and Hei-9-247548 for example disclose the technique of making correction by determining an arbitrary pixel of an arbitrary image as to its defect based on its correlation with the surrounding pixels during photographing operation of camera.

Furthermore Japanese patent laid-open application 2000-59690 discloses an electronic camera which previously retains location data of fault pixels in a memory and at the same time has a function capable of detecting defects also from an arbitrarily selected taken image in accordance with the exposure time so that it can deal with transient defects occurring at the time of a long exposure.

Now, the one disclosed in the above described Japanese patent laid-open application 55-156482 requires an exclusive memory for each individual sensor, i.e., each image pickup apparatus such as a camera. It cannot be jointly used by separate image pickup apparatus. Further, it cannot deal with the types of defect occurring due to the passage of time after the shipment of the image pickup apparatus. Furthermore, there is also a problem of increase in both price and dissipation power due to the fact that memory size for storing defect locations becomes very large proportionally to the increase in the number of pixels as a result of achieving a high-definition image. Moreover, there is another problem that it cannot deal with the types of defects which occur transiently in a long time exposure or under high temperatures.

The ones disclosed in Japanese patent laid-open applications Hei-6-6685 and Hei-9-289614, on the other hand, are capable of dealing with those defects which occur due to the passage of time. These, however, cannot deal with those transiently occurring defects such as the defects in the case of a temperature hike after continuation of normal image pickup conditions, since the certain image pickup conditions for detecting defects are the conditions outside the normal photographing. Moreover, in the case of detecting defects under certain image pickup conditions, since it is necessary to enter the defect detecting operation mode with limiting to such certain image pickup conditions, there is a problem that images cannot be taken during a long time period of such certain defect detecting operation mode.

Further, the techniques disclosed in Japanese patent laid-open applications Hei-7-23297 and Hei-9-247548 are capable of dealing with changes after the shipment or in temperature, since detection/correction of defects is performed for each image. There are many edge patterns, however, in an arbitrarily selected image and it is difficult to detect defects around edge. An attempt for accurately detecting the defects therefore results in a problem that the size of circuit and program becomes very large. In addition, while a high processing speed is a prerequisite in detecting defects in real time for each taken frame, an exceedingly large circuit and program size slows down the processing speed and makes a real time defect detection and correction thereof impossible.

Furthermore, while the electronic camera disclosed in Japanese patent laid-open application 2000-59690 is adapted to be capable of dealing with transient defects occurring at the time of a long time exposure, it is not uncommon that the occurrence of such transient defects under a long time exposure is concentrated in a small area. In such a case, an accurate detection of the defects is difficult. Also, there is another problem that the technique disclosed therein is incapable of dealing with those defects resulting from changes due to the passage of time after the shipment of the electronic camera.

SUMMARY OF THE INVENTION

To eliminate the above problems in image pickup apparatus having the known defect detecting/correcting functions, it is an object of the present invention to provide an image pickup apparatus in which pixel defects occurring on image are detected and corrected adaptively to the image scene or the operating state of the apparatus so that it is possible to precisely correct those fault pixels occurring afterwards because of changes due to the passage of time or those fault pixels transiently occurring under certain modes.

In accordance with a first aspect of the invention, there is provided an image pickup apparatus including: an image pickup device; a light blocking means for shutting out light incident upon the image pickup device; a subtraction means for subtracting a dark signal obtained as an output signal of the image pickup device when shutting out the incident light from a main image pickup signal obtained from the image pickup device at the time of a main image taking; a correction means for correcting defect signals occurring due to fault pixels of the image pickup device with respect to the subtracted image pickup signal from the subtraction means; and a control means for controlling the light blocking means consecutively before or after the main image taking so as to obtain a dark signal of a time duration corresponding to the number of occurrence of externally caused fault pixels of the image pickup device. In accordance with a second aspect of the invention, the control means of the image pickup apparatus according to the first aspect controls the light blocking means in accordance with an exposure time of the main image taking.

In image pickup apparatus, defects occur in every portion within an image and the defect detecting accuracy is greatly reduced for example at the time of a long time exposure. In the image pickup apparatus according to the above described first and second aspects, however, dark signals obtained by shutting out light for a time duration corresponding to the amount of occurrence of fault pixels of the image pickup device for example such as the exposure time of a main image taking are subtracted from the main image pickup signals at the time of the main image taking so that defects are detected with respect to the subtracted image pickup signals of which dark components are offset. It is thus possible to accurately detect the defects.

In accordance with a third aspect of the invention, the image pickup apparatus according to the first aspect further includes a temperature detection means for detecting a temperature of the image pickup device, and the control means controls the light blocking means in accordance with the temperature detected at the temperature detection means.

White-point defects of an image pickup device occur more frequently as the temperature becomes higher. By detecting defects with respect to subtracted image pickup signals resulting from the subtraction of dark signals obtained by shutting out light for a time duration corresponding to the temperature of the image pickup device as described above, however, the defects can be accurately detected even under changing temperatures irrespective of mode setting such as of the exposure time.

In accordance with a fourth aspect of the invention, there is provided an image pickup apparatus including: an image pickup device; a detection means for detecting fault pixels of the image pickup device from image pickup signals of a selected frame by selecting a predetermined frame from image pickup signals consecutively outputted as a plurality of frames from the image pickup device; a storage means for storing locations of the detected fault pixels; a correction means for correcting image pickup signals from the image pickup device on the basis of the locations of the fault pixels stored at the storage means; and a control means for controlling timing at which the fault pixel detection means detects fault pixels. Further, in accordance with a fifth aspect of the invention, the fault pixel detection means in the image pickup apparatus according to the fourth aspect detects fault pixels at every predetermined number of frames.

In the case of consecutively taking a plurality of frames, it is not necessary to detect defects at each frame, since difference in image is not large between consecutive frames. In the image pickup apparatus according to the above described fourth and fifth aspects, since defects are detected by selecting a predetermined frame for example at every predetermined number of frames from the image pickup signals consecutively outputted as a plurality of frames and the locations of the defects are stored to correct the defects, it is possible to correct the defects without detecting defects at each frame. It is thereby possible to avoid easily cognizable fault pixels which occur due to the fact that the defects are seen and not seen by frames.

In accordance with a sixth aspect of the invention, the fault pixel detection means in the image pickup apparatus according to the fourth aspect detects fault pixels only at the first frame of a number of consecutive frames.

When defects are to be detected by frame, the defect detection processing takes time and performance of a further image taking within such processing time may become impossible. The above problem, however, can be avoided by detecting defects only with respect to the first frame as described above.

In accordance with a seventh aspect of the invention, the fault pixel detection means in the image pickup apparatus according to the fourth aspect detects fault pixels at predetermined time intervals or during an intermission of photographing after a main photographing.

An image taking at a desired point in time may become impossible if time is consumed in defect detection processing. The above problem, however, can be eliminated by as described detecting defects at predetermined time intervals or when image is not being taken.

In accordance with an eighth aspect of the invention, the image pickup apparatus according to any one of the fourth to seventh aspects further includes a motion detection means for detecting a motion in image within a frame so that the fault pixel detection means detects fault pixels with respect to a frame or a region within frame of which a motion quantity detected by the motion detection means exceeds a predetermined value.

Since, in consecutive taking of images, changes in image are smaller between frames where motion of the object is small, it is not necessary to detect defects at every frame. In the image pickup apparatus according to the above described aspect, since the motion detection means is provided so that defects are detected when the motion detecting quantity exceeds a predetermined value, it is possible not to detect defects at frames where motion is small.

In accordance with a ninth aspect of the invention, there is provided an image pickup apparatus including: an image pickup device; a storage means for previously storing the locations of fault pixels of the image pickup device; an edge detection means for detecting edges in image from image pickup signals outputted from the image pickup device; a fault pixel detection means for detecting fault pixels of the image pickup device from a frame or a region in frame having a value of edges less than a predetermined value on the basis of an output from the edge detection means; and a defect correction means for obtaining locations of fault pixels by adaptively switching between the fault pixel detection means and the storage means based on an output from the edge detection means so as to correct image pickup signals corresponding to the obtained locations of the fault pixels. Here the storage means includes one that stores the locations of fault pixels at the time of shipping from factory or one that stores the locations of fault pixels previously detected at the fault pixel detection means.

While errors tend to occur when defects in an image having many edge components are to be detected, it is possible to accurately detect defects by detecting the defects only with respect to those images having relatively less edge components as described above.

In accordance with a tenth aspect of the invention, the image pickup apparatus according to the ninth aspect further includes an edge reduction means for forming an image having reduced edges on the image pickup device so that the fault pixel detection means detects fault pixels in a state where edges are reduced by the edge reduction means.

By such construction, defect detection at high accuracy can be performed for example even in the case of taking an image of object having many edge components.

In accordance with an eleventh aspect of the invention, there is provided an image pickup apparatus including: an image pickup device; a detection means for detecting fault pixels of the image pickup device from image pickup signals outputted from the image pickup device; a storage means for storing locations of the detected fault pixels; and a defect correction means for correcting image pickup signals corresponding to the locations of the fault pixels stored at the storage means, wherein the fault pixel detection means detects fault pixels corresponding to one frame by image pickup signals of a plurality of frames and stores the locations of the fault pixels to the storage means.

In the case where the processing speed becomes slower due to an increased size of defect detection/correction processing, it is difficult to perform and update the defect detection by each frame. The above problem, however, can be eliminated by changing regions in image to be detected of defects by the frame as described so as to obtain a defect detecting result corresponding to one frame from several frames.

BRIEF DESCRIPTION OF THE DRAWINGS

FIG. 12 is a timing chart for explaining operation of a fourth embodiment.

FIG. 13 is a timing chart for explaining an example of operation of a fifth embodiment.

DESCRIPTION OF THE PREFERRED EMBODIMENT

Figure 1:
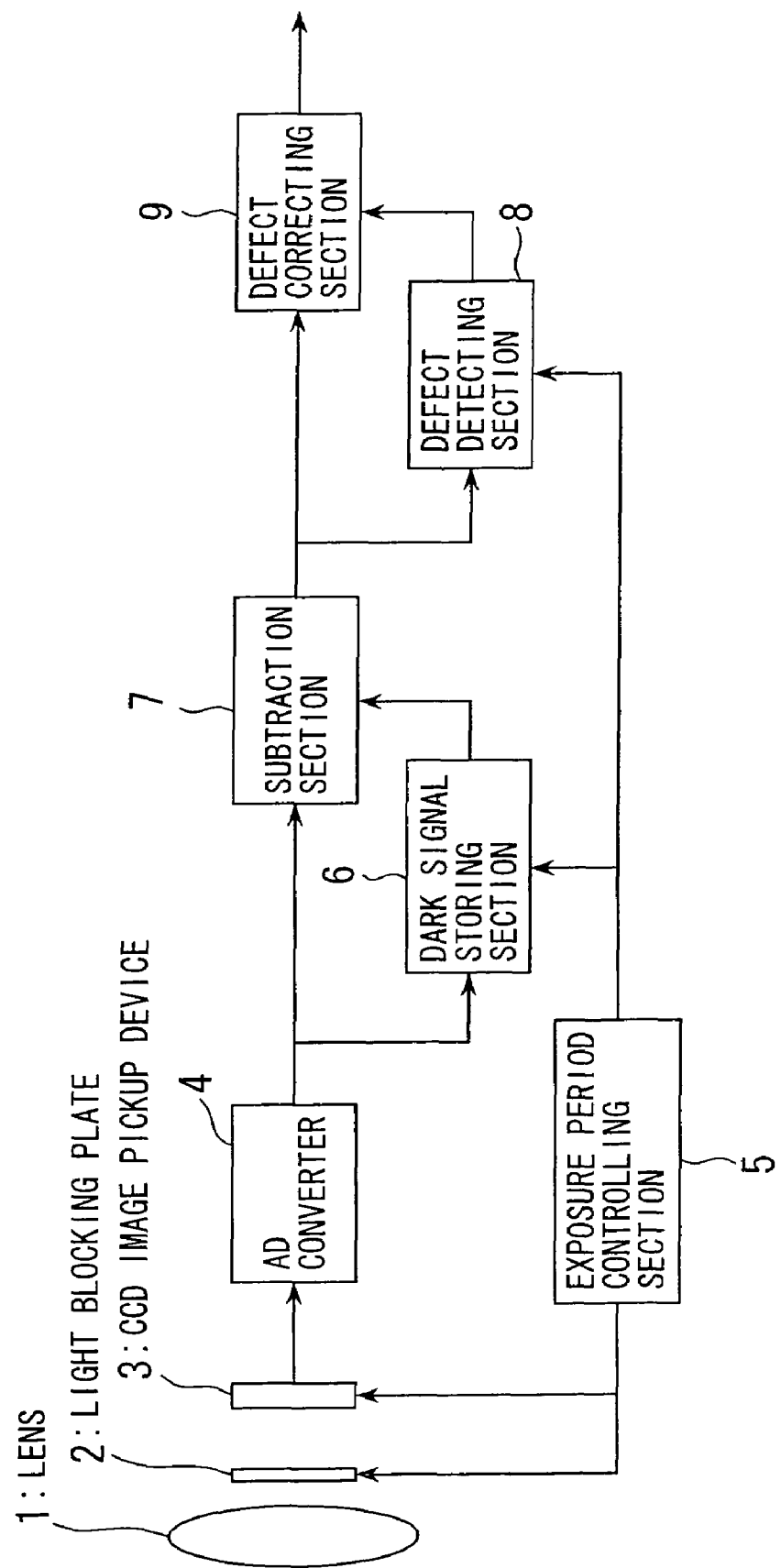
FIG. 1 is a block diagram showing construction of a first embodiment of the image pickup apparatus according to the invention.

Some embodiments of the invention will now be described. FIG. 1 is a block diagram showing a first embodiment of the image pickup apparatus according to the invention. The present invention is not limited to black-and-white image pickup apparatus and can be applied to any type of image pickup apparatus including color image pickup apparatus. For ease of explanation, however, the present invention in the embodiments below including the present embodiment will be shown as that applied to an electronic camera which uses a black-and-white CCD image pickup device.

Referring to FIG. 1, numerals are used to denote: 1, a lens through which an object light is caused to enter; 2, a light blocking plate; 3, a black-and-white CCD image pickup device for photo electrically converting the object light into electrical signals; 4, an analog-to-digital converter for converting image pickup signals outputted from the CCD image pickup device 3 into digital signals; and 5, an exposure period controlling section for controlling such as the exposure period of the CCD image pickup device 3 by controlling the light blocking plate 2 and CCD image pickup device 3. Numeral 6 denotes a dark signal storing section consisting for example of DRAM for storing dark signals to be obtained from the CCD image pickup device 3 in a state where the incident light is shut out by the light blocking plate 2; and numeral 7 denotes a subtracting section for subtracting dark signals stored at the dark signal storing section 6 from main image pickup signals obtained from the CCD image pickup device 3 by a main exposure where the light blocking plate 2 is retracted. A dark signal canceling section is constituted by the dark signal storing section 6 and the subtracting section 7.

Numeral 8 denotes a defect detecting section for detecting defects from the subtracted image pickup signals obtained by subtraction of the dark signals at the dark signal canceling section; and numeral 9 denotes a defect correcting section for performing correction of the fault pixels detected at the defect detecting section 8. It should be noted that the above described exposure period controlling section 5 includes CPU or the like for managing the system. In addition to the controlling of the light shutting out timing at the light blocking plate 2 and the charge accumulating time of CCD image pickup device 3 as described above, it is adapted to adjust the dark signal storing timing at the dark signal storing section 6 and the defect detecting parameter at the defect detecting section 8.

Operation of thus constructed electronic camera will now be described. First, a description will be given below with reference to the timing chart shown in FIG. 2 of the operation until the production of subtracted image pickup signal obtained by the subtraction of dark signal at the dark signal canceling section which is consisting of the dark signal storing section 6 and the subtracting section 7. At the time of subtracting operation of dark signal, the light blocking plate 2 is first inserted into the optical path and, in the state where the incident light from lens 1 is shut out, an accumulation of dark charge corresponding to the same time period as the exposure time of a desired main photographing is performed at the CCD image pickup device 3. Thereby a dark frame signal corresponding to the main exposure time for a desired photographing can be obtained from the CCD image pickup device 3.

Next, the light blocking plate 2 is retracted from the optical path so as to start a main exposure image taking and at the same time the dark signal is read out and the dark signal is stored to the dark signal storing section 6. Then, the main image pickup signal obtained by the main exposure image taking is read out and at the same time the dark signal stored at the dark signal storing section 6 is read out. The subtraction processing of the two is performed at the subtracting section 7. At this time, since dark components corresponding to the dark signal are also included in the main exposure image pickup signal obtained by the main exposure image taking, the subtracted image pickup signal subtracted of the dark components is outputted by the subtraction processing at the subtracting section 7 as described.

Figure 2:
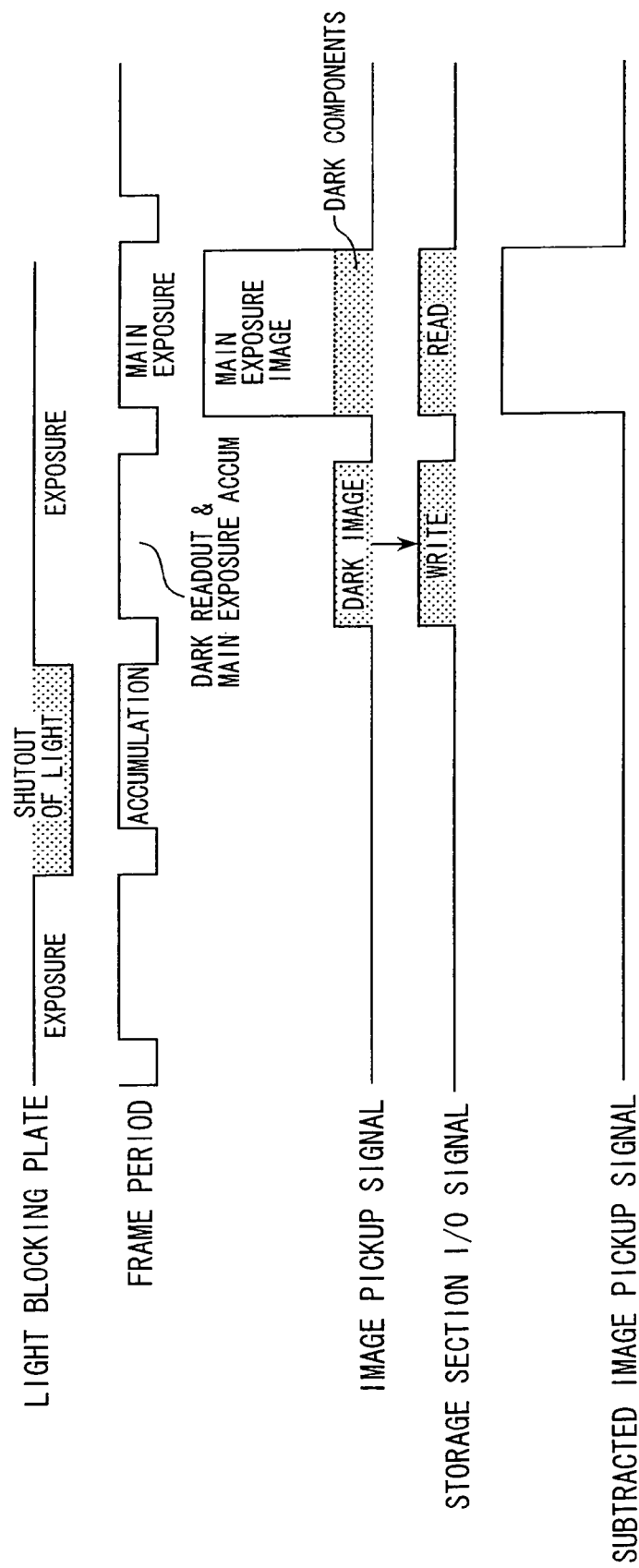
FIG. 2 is a timing chart for explaining operation of the dark signal cancel section in the first embodiment shown in FIG. 1.

For simplification in the above description of the dark component subtracting operation by way of the timing chart shown in FIG. 2, the description has been given of an example in one shot photographing using CCD image pickup device 3 of an interline readout system where the frame rate in readout is set to the same as the frame rate during exposure/accumulation time and light is not shut out when readout is performed.

Further, the above described embodiment has been shown as that in which the light blocking plate 2, dark signal storing section 6 and subtracting section 7 are used to perform the subtraction of the dark signal of CCD image pickup device 3. It is however also possible that the main exposure image pickup signal is stored to the dark signal storing section 6 so that a subtraction image pickup signal subtracted of dark signal is obtained by subtracting a dark signal similarly obtained immediately after the main exposure image taking from the main exposure image pickup signal which has been stored to the dark signal storing section 6.

In the present embodiment, defects are detected at the defect detecting section 8 and correction processing is performed at the defect correcting section 9 with respect to thus obtained output signal (subtraction image pickup signal) from the subtractor 7 which has been subtracted of the dark signal. A description will now be given with respect to the defect detecting operation and defect correcting operation at the defect detecting section 8 and defect correcting section 9. At the defect detecting section 8, the determination as to defect of observed pixel Xn is performed for example by an arithmetic as shown below so that defects are sequentially detected: Here "n" is defined as n☐1 and represents the number of pixels in an inputted image file.

Figure 3:
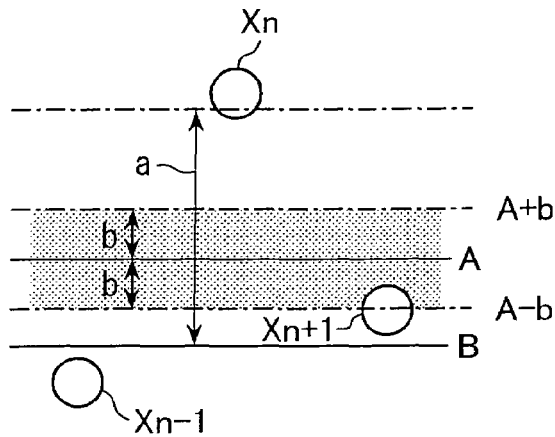
FIG. 3 shows the operation principle of the defect detecting section in the first embodiment shown in FIG. 1.
Figure 4:
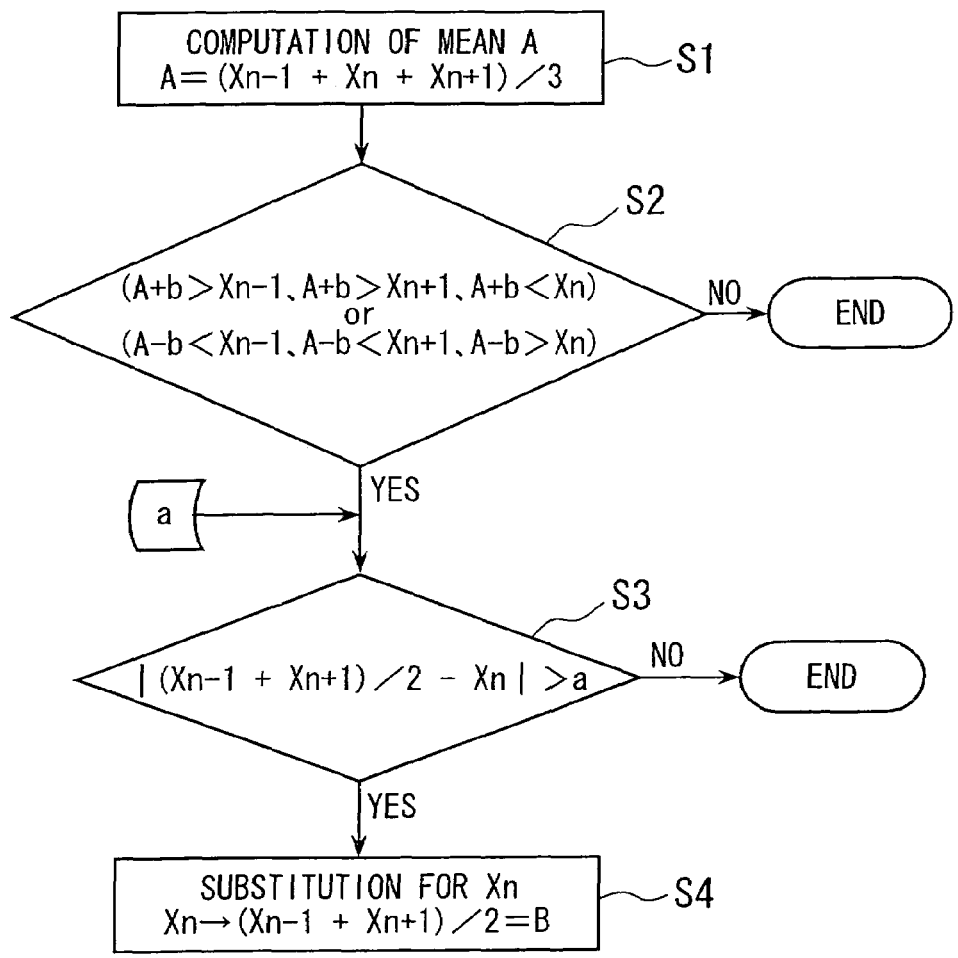
FIG. 4 is a flowchart for explaining operation of the defect detecting section and defect correcting section in the first embodiment shown in FIG. 1.

Specifically, as shown in FIG. 3, the observed pixel Xn and two pixels Xn−1, Xn+1 next thereto on the both sides are used so as to determine whether it is faulty or not by the procedure indicated by the flowchart in FIG. 4. When determined as faulty, it is corrected. In particular, mean value A of the outputs of the observed pixel Xn to be judged of and of its two adjacent pixels Xn−1, Xn+1 is first obtained by the following formula (1) (step S1).

$$A = (Xn-1 + Xn + Xn+1)/3 \quad (1)$$

The output of each pixel is then compared with mean value A so as to determine whether a necessary condition as indicated in the following formula (2) is satisfied or not (step S2).

$$[A+b>Xn-1, A+b>Xn+1, A+b<Xn] \text{ or } [A-b<Xn-1, A-b<Xn+1, A-b>Xn] \quad (2)$$

where b is a defect detecting variable input parameter (threshold) having a value of b☐0, which is varied in accordance with the exposure/accumulation time of the CCD image pickup device.

If the necessary condition indicated by the above formula (2) is satisfied, it is further determined whether a necessary condition of the following formula (3) is satisfied or not (step S3).

$$|(Xn-1+Xn+1)/2 - Xn| > a \quad (3)$$

where, like b, a is a defect detecting variable input parameter (threshold) having a value of a☐0, which is varied in accordance with the exposure/accumulation time of the CCD image pickup device.

If the necessary condition indicated by the above formula (3) is satisfied, the observed pixel Xn is determined as a fault pixel. The value of Xn determined as fault pixel is then interpolated by replacing it with $(Xn-1+Xn+1)/2 = B$ (step S4).

Figure 5:
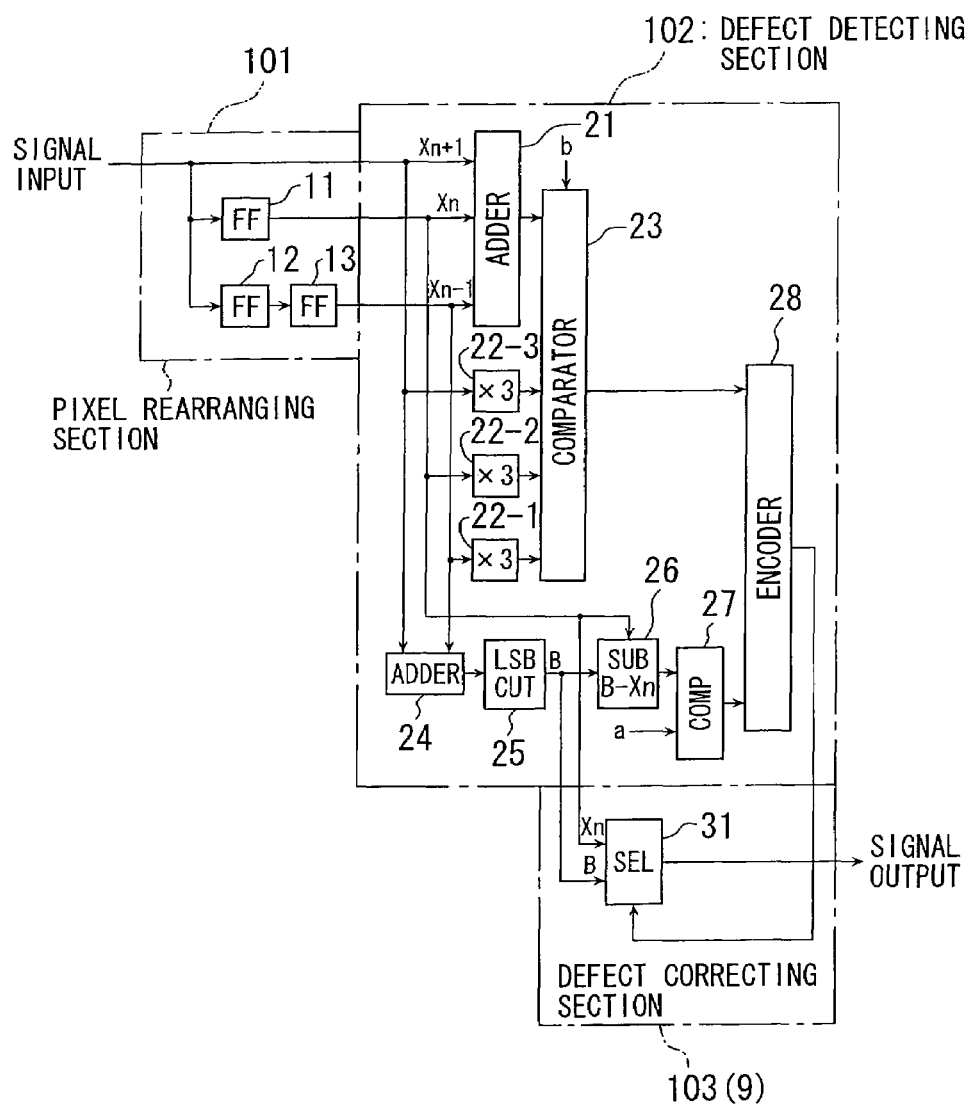
FIG. 5 is a block diagram showing construction of the defect detecting section and defect correcting section in the first embodiment shown in FIG. 1.

A description will now be given by way of FIG. 5 with respect to an example of hardware construction of the defect detecting section 8 and defect correcting section 9 for performing the defect detection shown in the flowchart of FIG. 4. Referring to FIG. 5, numeral 101 denotes a pixel rearranging section for adjusting timings of the pixel signals of the three pixels, i.e., the observed pixel Xn and the two adjacent pixels Xn−1, Xn+1, including three flip-flops 11, 12, 13 each for causing one-pixel delay.

Numeral 102 denotes a defect detecting section, which includes: a first adder 21 for obtaining a mean value by adding together the three pixel signals of Xn−1, Xn, Xn+1 (letting one obtained by the addition correspond to mean value A of the above formula (1), since the hardware construction for division becomes large in size); multipliers 22-1, 22-2, 22-3 for respectively tripling the three pixel signals; a first comparator 23 for comparing the value obtained by addition of the added output A of the first adder 21 and variable input parameter b set and inputted from the exposure period controlling section 5 with the respective output of the multipliers 22-1, 22-2, 22-3; a second adder 24 for adding the pixel signals of pixels Xn−1, Xn+1 which are adjacent to the observed pixel Xn on the both sides thereof; an LSB cut circuit 25 for acquiring ½ of the output of the adder 24 to obtain a mean; a subtractor 26 for subtracting the pixel signal of the observed pixel Xn from the output signal of the LSB cut circuit 25 (mean value B of the two pixels); a second comparator 27 for comparing the output of the subtractor 26 with the variable input parameter "a" inputted from the exposure period controlling section 5; and an encoder 28 for determining as to defect of the observed pixel Xn from the result of comparison at the first and second comparators 23, 27. Here, the defect detecting section 8 as shown in FIG. 1 is constructed by the pixel rearranging section 101 and the defect detecting section 102.

Numeral 103 denotes a defect correcting section, corresponding to the defect correcting section 9 as shown in FIG. 1, which includes a selector 31 for selectively outputting the pixel signal of the observed pixel Xn or mean value B of the two adjacent pixels Xn−1, Xn+1 on the basis of the determination output of the encoder 28 of the above described defect detecting section 102.

A description will now be given with respect to operation of thus constructed defect detecting section 102 and defect correcting section 103. First, at the pixel rearranging section 101: the pixel signal of one of the adjacent pixels, Xn−1, is delayed by two pixels through the two flip-flops 12, 13 and inputted to the first adder 21; the pixel signal of the observed pixel Xn is delayed by one pixel through the one flip-flop 11 and also inputted to the first adder 21; and the pixel signal of the other adjacent pixel Xn+1 is directly inputted to the first adder 21. At the first adder 21, then, these inputted pixel signals Xn−1, Xn, Xn+1 are added together to compute a mean value (3A) corresponding to A of the formula (1).

On the other hand, the pixel signals $Xn-1$, $Xn$, $Xn+1$ to be inputted to the first adder 21 are also inputted to the multipliers 22-1, 22-2, 22-3, respectively. The pixel signals of $3Xn-1$, $3Xn$, $3Xn+1$ outputted from the respective multipliers 22-1, 22-2, 22-3, the output 3A of the first adder 21 and the variable input parameter b are then inputted to the first comparator 23 for comparison. In other words, it is determined at the first comparator 23 as to whether the condition indicated in the formula (2) is satisfied or not, i.e., the conditions of:

$(A+b>Xn-1, A+b>Xn+1, A+b<Xn)$ or $(A-b<Xn-1, A-b<Xn+1, A-b>Xn).$

Further, of the three pixel signals to be inputted to the first adder 21, the adjacent pixel signals $Xn-1$, $Xn+1$ are inputted to the second adder 24 for addition. The added output is inputted to the LSB cut circuit 25 where it is reduced to ½ by cutting the least significant one bit (LSB) to obtain a mean value $[B=(Xn-1+Xn+1)/2]$ of the adjacent pixel signals. At the subtractor 26, then, subtraction is performed between the mean value B of the adjacent two pixel signals and the pixel signal of the observed pixel Xn. The result of the subtraction at subtractor 26 is then compared with the variable input parameter "a" at the second comparator 27 so as to determine whether the condition indicated by the above described formula (3) is satisfied or not, i.e., $|(Xn-1+Xn+1)/2-Xn|>a$. If both are satisfied in determining the conditions at the first comparator 23 and second comparator 27, the observed pixel Xn is determined as faulty at the encoder 28.

In making determination as to whether the conditions are satisfied at the first and second comparators 23, 27, a digital value "H" for example is respectively outputted if each inequality for indicating a condition is satisfied and "L" is outputted for other cases. The determination is made by forming all inequality outputs indicating the conditions into a logical value table, and being for example coded by an encoder.

When the observed pixel Xn is determined as faulty at the encoder 28, the defect correcting section 103 causes the selector 31 to output the mean value B of the adjacent pixels as a correction signal instead of the pixel signal Xn of the observed pixel on the basis of the output of the encoder 28. In other cases, the observed pixel Xn is determined as a normal pixel and the pixel signal Xn of the observed pixel is outputted as it is.

In solid-state image pickup devices such as CCD image pickup device, the amount of electric charge accumulated in a unit time greatly varies from one pixel to another including the effect of ambient temperature. At the time of a long time exposure where charge is continuously accumulated for a longer period of time, the variance as described becomes conspicuous as white point defects. The white point defects occur in every portion within the image. Such defects may be concentrated in a certain portion within the image. The accuracy is greatly reduced in detecting defects from the image in such case, since the defects are detected by using data of fault pixels themselves.

By contrast, in the present embodiment, it becomes possible to accurately detect defects, since dark image to be subtracted is obtained by continuously accumulating charge with shutting out light for the same period as the image photographed by the main exposure and defects are detected with respect to an image where such dark components are canceled. Further, the variable input parameters (threshold) a, b for use in detecting defects are varied in accordance with the charge accumulating time at the image pickup device so that it is made possible to change the detecting accuracy according to the situation of the number of transiently occurring defects.

Figure 6:
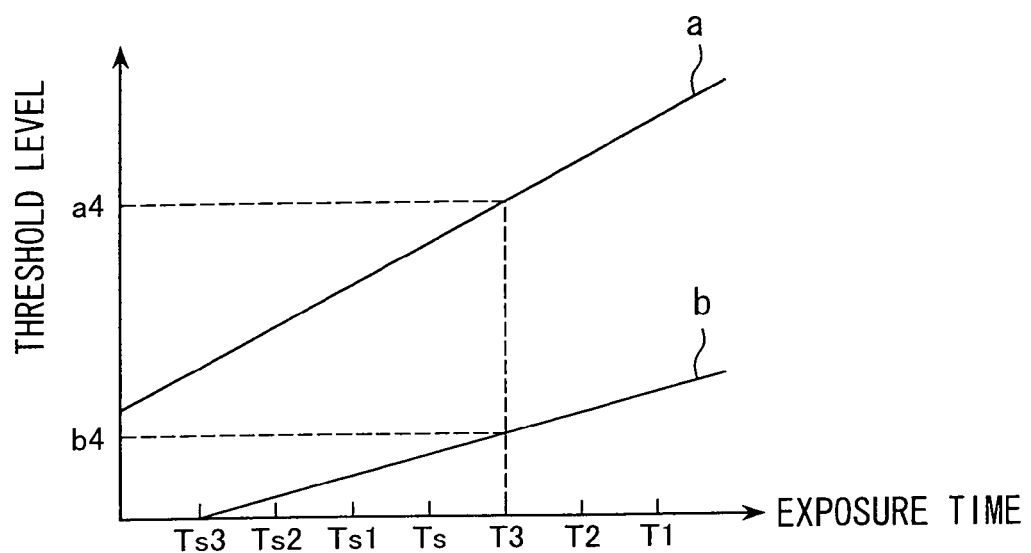
FIG. 6 shows the relationship between exposure time to be set at the exposure period controlling section and variable input parameters (threshold) in the first embodiment shown in FIG. 1.

A description will now be given by way of FIG. 6 for indicating the relationship between exposure time and thresholds a, b and the flowchart of FIG. 7 with respect to the total operation of the present embodiment with a detailed description of the setting of the variable input parameters (threshold) a, b by the exposure period controlling section 5. Since the level of white points is more conspicuous as the exposure time becomes longer, the variable input parameters (threshold) a, b are set as shown in FIG. 6 so that they become larger proportionally to the exposure time. T3 in exposure time of FIG. 6 indicates the exposure time corresponding to the shortest exposure time region of those in the case of performing the dark signal subtraction processing. The values of thresholds a, b, i.e., the variable input parameters at such exposure time are represented by a4, b4.

Upon start of photographing, it is first determined at the exposure period controlling section 5 whether the main exposure image pickup time is longer than a predetermined exposure time Ts or not, based on which it is determined whether dark signal subtraction processing is to be performed or not. If, in the above determination of exposure time, the exposure time is longer than the predetermined exposure time Ts, a dark condition of the same time duration as the main exposure time is produced by means of an operation of the light blocking plate 2. A dark signal obtained from the image pickup device 3 at this time is taken into the storage section 6. The dark signal is subtracted from the main exposure image pickup signal to be taken immediately thereafter. With respect to the subtracted image pickup signal obtained by such subtraction, an identification is further made of the range in which the main exposure time is set. Particularly, in the example indicated by the flowchart of FIG. 7, it is categorized into the cases of: exposure time>T1; T1☐exposure time>T2; T2☐exposure time>T3; and T3☐exposure time>Ts. The thresholds a, b for detecting defects are then optimized according to the level of the categorized exposure time. Particularly, in the example indicated by the flowchart of FIG. 7, defects are detected by setting thresholds a, b to: a1, b1; a2, b2; a3, b3; a4, b4, respectively, and the defects are then corrected.

On the other hand, if the exposure period is shorter than Ts in the determination as to whether the exposure time is longer than the predetermined exposure time Ts or not, the dark signal canceling operation is not performed; and main exposure image pickup signals are taken in immediately after the start of photographing so that defect detection and defect correction are performed with respect to the image pickup signals. At this time, after similarly identifying the range in which the main exposure time is set, defects are detected and corrected by optimizing thresholds a, b according to such level.

Figure 7:
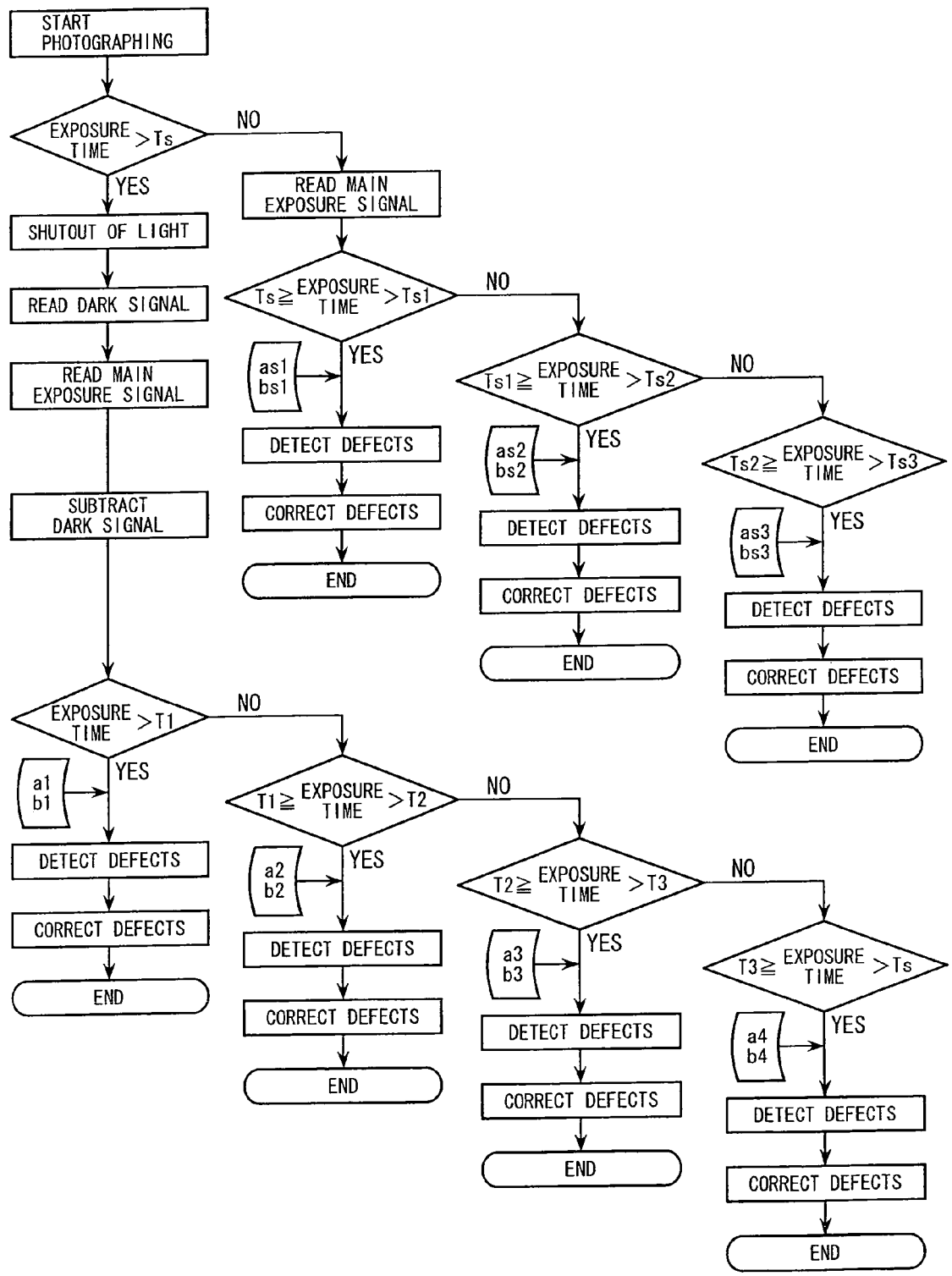
FIG. 7 is a flowchart for explaining the total operation of the first embodiment shown in FIG. 1.

Particularly, in the example indicated by the flowchart of FIG. 7, there are categories of: Ts☐exposure time>Ts1; Ts1☐exposure time>Ts2; Ts2☐exposure time>Ts3. For each of the categorized exposure time, defects are detected and corrected by setting the thresholds to: as1, bs1; as2, bs2; as3, bs3; respectively.

A second embodiment of the invention will now be described by way of FIG. 8. The above described first embodiment has been shown as that in which control of dark signal canceling operation and control of thresholds a, b for detecting defects are performed in accordance with exposure time regarded as the external cause of defects, though it as a result leads to an increase in temperature. In the second embodiment, irrespective of actual modes such as of exposure time, control of dark signal canceling operation and setting of thresholds a, b for detecting defects are performed simply in accordance with the rise in temperature of the image pickup device which is caused for example due to an external air temperature or operation time of the electronic camera.

Figure 8:
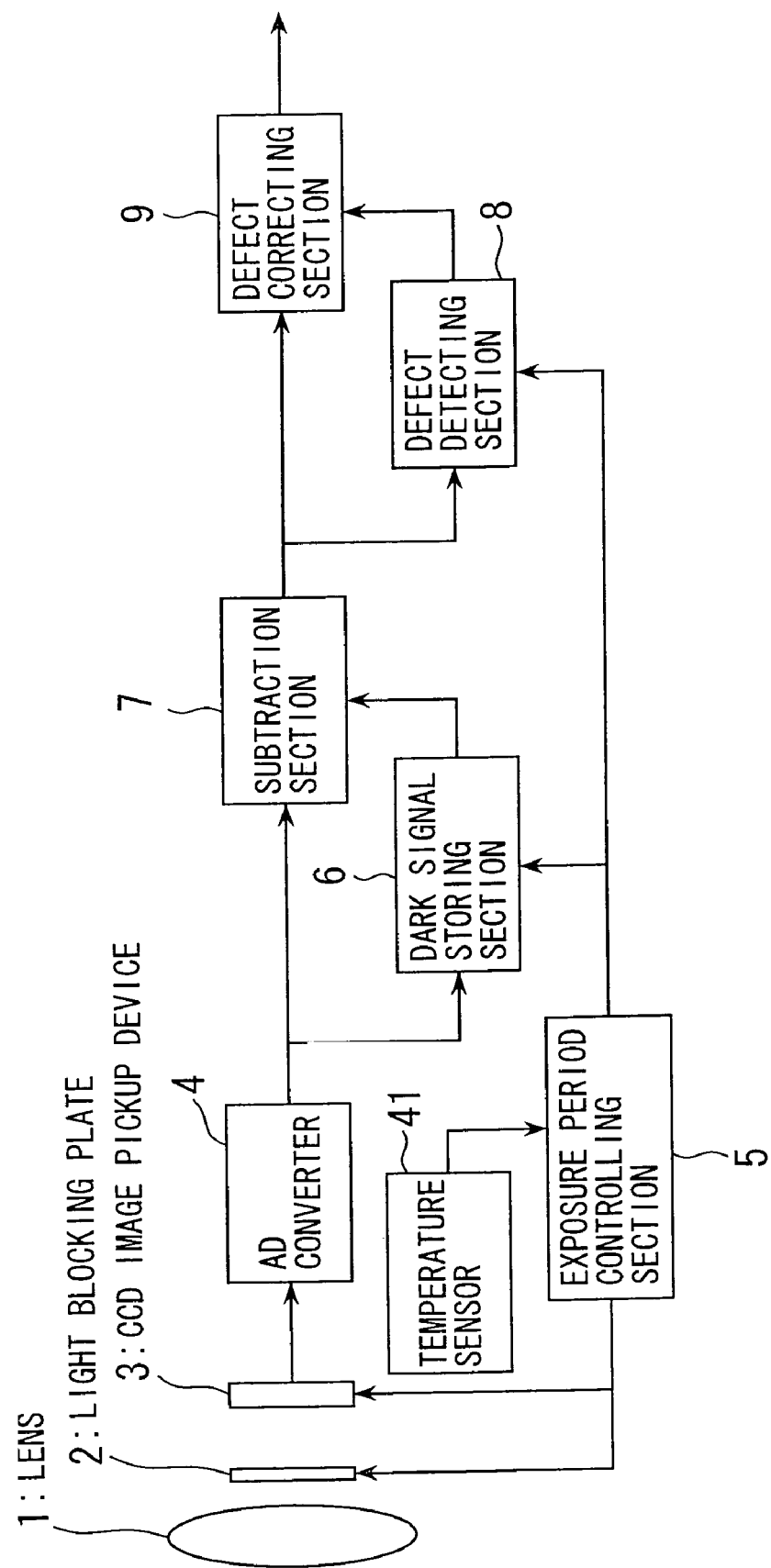
FIG. 8 is a block diagram showing a second embodiment of the invention.

In particular, as shown in FIG. 8, a temperature sensor 41 for detecting temperature of the CCD image pickup device 3 is disposed in the vicinity thereof. The exposure period controlling section 5 is adapted to control the dark signal canceling section and set thresholds a, b for detecting defects in accordance with changes in temperature detected at the temperature sensor 41.

The relationship between the defect detecting thresholds a, b and the temperature is similar to what is obtained by letting the temperature correspond to the exposure time in the relationship between the exposure time and thresholds as shown in FIG. 6. Further, the flow of camera operation is similar to an operation where exposure time is replaced by temperature in the flowchart of the first embodiment shown in FIG. 7.

With an increase in the temperature, the charge excitation rate of the image pickup device is increased and the variance in charge amount of each pixel becomes easily noticed, whereby white-point defects are caused to occur similarly to the case of a long time exposure. In the present embodiment, however, defect detection/correction is rendered to a subtracted image pickup signal of which dark signal is canceled by the dark signal canceling section so that correction can be performed by accurately detecting defects. Further, since the variable input parameters (threshold) a, b at the time of detecting defects are varied in accordance with changes in temperature, it becomes possible to change detection accuracy according to the situation of the number of transiently occurring defects so that erroneous detection can be reduced.

A third embodiment will now be described. In the case of detecting defects from an image, there is a possibility that fault pixels cannot be detected because of the effect such as of edge pattern or noise in the image. In the case of consecutive photographing with a large number of image pickup frames per second, motion of an object becomes slower as compared to the frame rate so that difference in taken images becomes decreased between the consecutive frames. As long as changes in the scene are not extensive as described, therefore, it is not necessary to continuously detect defects at every frame and it suffices to correct defects by means of once detected result of defects.

Figure 9:
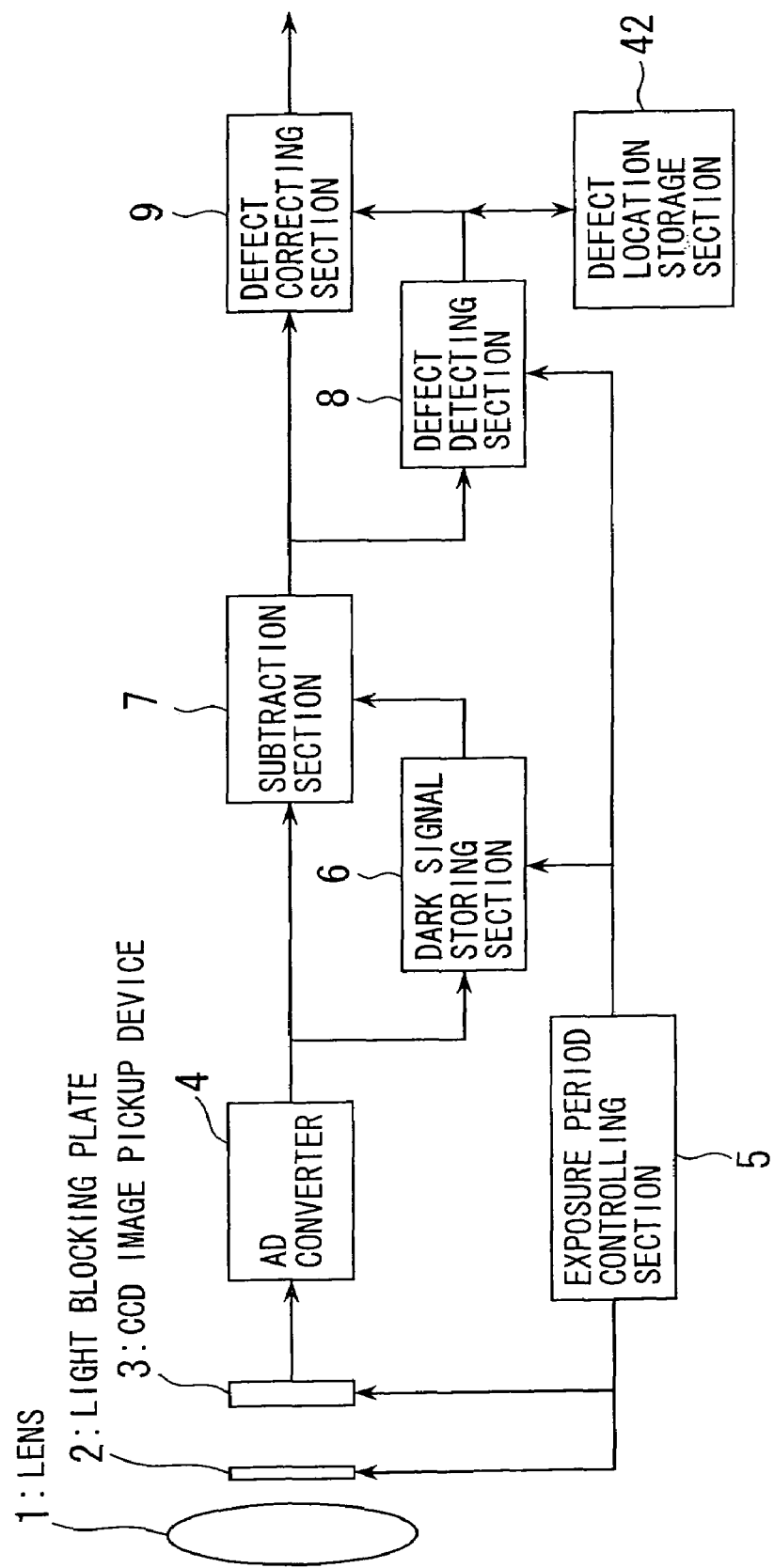
FIG. 9 is a block diagram showing a third embodiment of the invention.

The third embodiment is adapted to deal with such conditions. In particular, as shown in FIG. 9, a defect location storing section 42 consisting for example of DRAM for temporarily storing the result of defect detection is provided so that defects are corrected by using such defect location information until the stored contents have been updated. As the defect location information, it suffices for example to use pixel position information in the horizontal and vertical directions within the image. It should be noted that this embodiment is applicable even to the case of not providing a dark signal canceling section in the above described construction.

In thus constructed third embodiment, when images are consecutively taken or when the camera is capable of varying frame rate, the exposure period controlling section 5 determines whether the frame rate is higher than a predetermined rate or not i.e., whether frame period T is shorter than a predetermined period Th, and, based on this, controls the defect detecting section 8. In particular, the defect detecting section 8 detects defects from a frame image immediately after making such determination or at a timing close thereto, and the results thereof are stored to the defect location storing section 42. Thereafter, defects are detected and the defect location information is updated at predetermined intervals after such frame. By thus performing defect detection/correction, it becomes possible not to make the fault pixels easily cognizable due to their being seen and not seen frame by frame.

Figure 10:
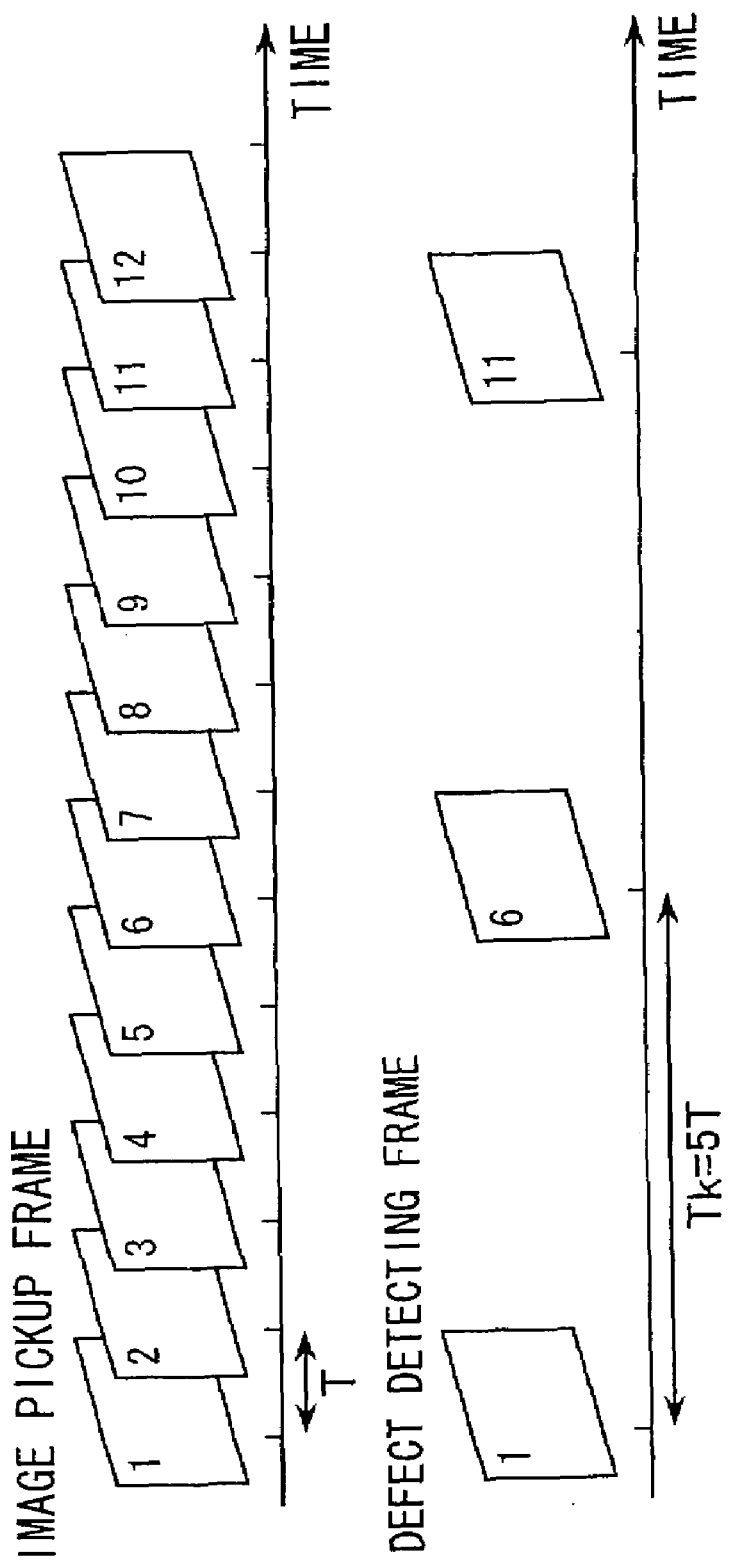
FIG. 10 is a timing chart showing an example of operation in the third embodiment.

Of consecutively taken frames where one frame period is T, FIG. 10 shows the case of 5 frames being a unit of defect detecting frame period Tk, i.e., the manner of performing defect detection by an interval of 5T.

Figure 11:
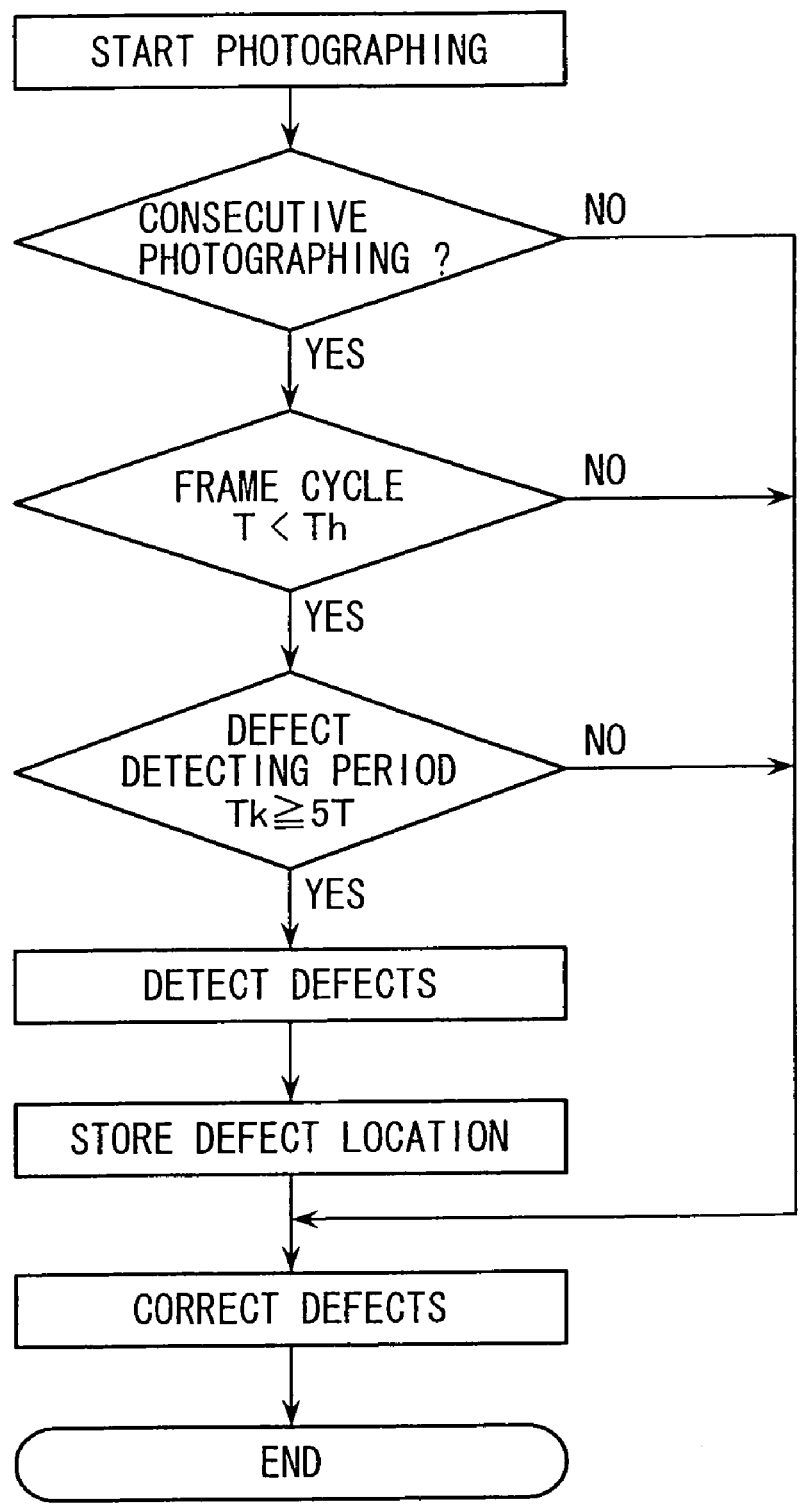
FIG. 11 is a flowchart for explaining an example of operation in the third embodiment.

Further, FIG. 11 is a flowchart for explaining the operation of the present embodiment in the case of performing defect detection/correction in the manner shown in FIG. 10. This operation may be explained simply as follows. After the start of photographing, defects are detected anew if it is a consecutive photographing and if frame period T is shorter than the predetermined period Th and if the defect detecting period Tk has become longer than 5T. The defect location information is stored to the defect location storing section 42 and defect correction is executed on the basis of such information. In other cases, defect correction is executed by using the defect location information which has already been stored to the defect location storing section 42.

A fourth embodiment will now be described. The hardware construction of this embodiment is similar to that of the third embodiment shown in FIG. 9. In this embodiment, as long as a high-speed consecutive photographing is continued: defects are detected with respect to the first one frame; and, after storing such defect location information to the defect location storing section 42, defects are corrected without updating the detection results of defect until the completion of such high-speed consecutive photographing. FIG. 12 shows the manner of detecting defects only at the first one frame (indicated by mesh) in the case where 12 frames are taken consecutively.

By such construction, for example in the case where time is required in the defect detection processing though it is desirable to detect defects by each frame, it is possible to avoid such problems as that a frame cannot be taken afresh by taking a new photograph during the performance of defect detection.

A fifth embodiment will now be described. The hardware construction of this embodiment, too, is similar to that of the third embodiment shown in FIG. 9. In this embodiment, the contents of the defect location storing section 42 are updated: by detecting defects at every predetermined time interval irrespective of the number of frames; or by detecting defects using time in a non-shooting condition where photograph is not taken for example when the electronic camera is in an image displaying mode, at the time of image storage processing or in an image editing mode.

When it takes time to detect defects as in the case of the fourth embodiment or when a defect detecting function is executed by software processing, there occurs a problem that the processing time of CPU is occupied and it becomes impossible to take photograph. As in the fifth embodiment, however, the above problem can be avoided by detecting and updating defects at every predetermined time interval or when photograph is not being taken.

A description will now be given by way of the timing chart of FIG. 13 with respect to a typical example in the present embodiment where the technique is used of detecting and updating defects when photograph is not being taken. In the case where the electronic camera has entered a non-shooting condition four frames after the start of photographing and photographing is to be resumed three frames thereafter, such non-shooting period, Tk1, is determined as a defect detecting period. At this time, the defect detection is executed on the basis of image information of the third frame which is the last of the taken frames, and the defect location information is stored to the defect location storing section 42. If photographing is resumed, the defect detection is discontinued at that point in the processing and the photographing is immediately started. If defect detecting operation with respect to all the pixels within one frame is not complete in the first defect detecting period Tk1, the defect detection processing is executed in the next non-shooting period Tk2 for those pixels which have not been subjected to the detecting operation and the defect location information is stored to the defect location storing section 42. Further, it is also possible that a photograph corresponding to one frame (k1, k2) is taken only for the purpose of defect detection during non-shooting to detect defects on the basis of such frame k1, k2.

Figure 14:
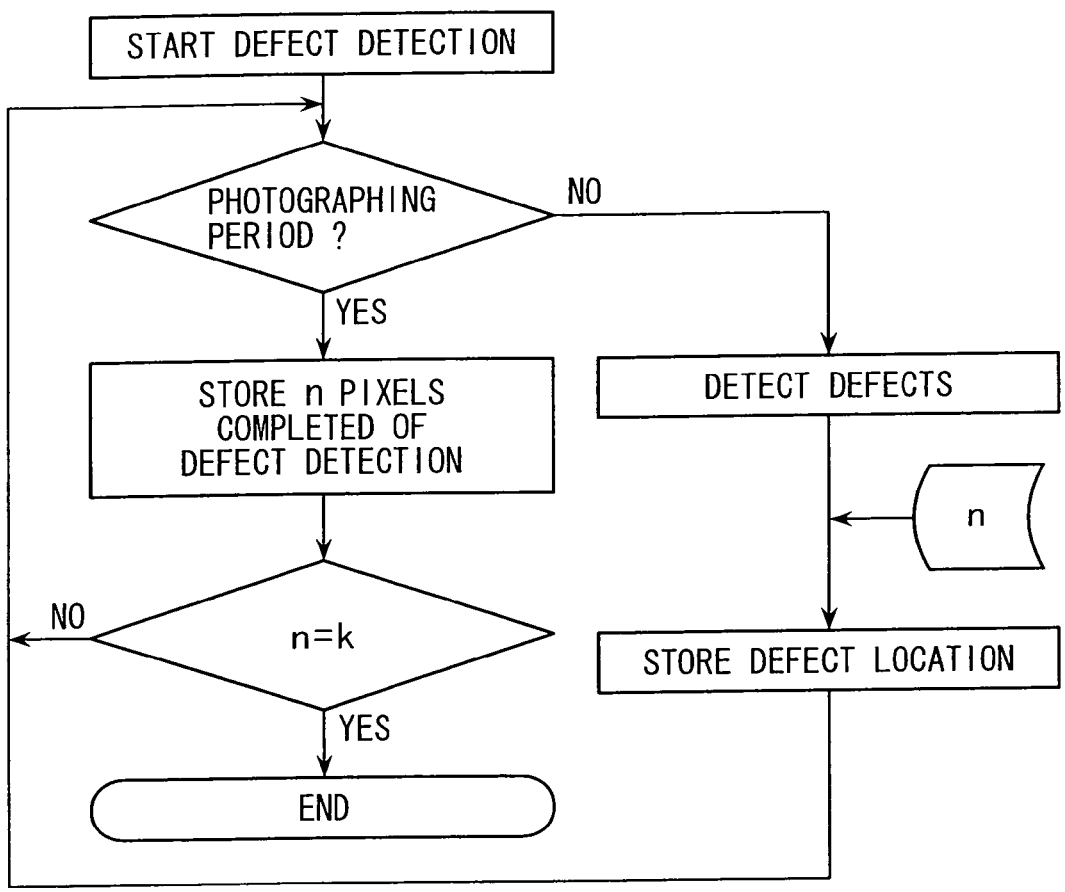
FIG. 14 is a flowchart for explaining operation of the fifth embodiment.

A description will now be given by way of the flowchart shown in FIG. 14 furthermore with respect to the technique for performing the defect detection processing during non-shooting as described above. It is first determined by the exposure period controlling section 5 whether or not the electronic camera is in a shooting period where photograph is being taken. If not in a shooting period, the electronic camera enters the defect detecting mode so that fault pixels in n pixels of the image pickup device are detected and the fault pixel location information is stored to the defect location storing section 42. Such defect detection/storage processing is performed for each one pixel so that, if photographing is resumed, the number of pixels n for which the defect detection processing has been complete is stored to certain register and the defect detection processing is temporarily discontinued. When a non-shooting period is resumed, the value of n is recognized so that the defect detection operation is resumed starting from the pixel of which detection has not been complete. The above operation is repeated until the completion of defect detection with respect to all pixels k. It should be noted that correction processing is regularly executed for the photographed frames on the basis of the defect location information.

Figure 15:
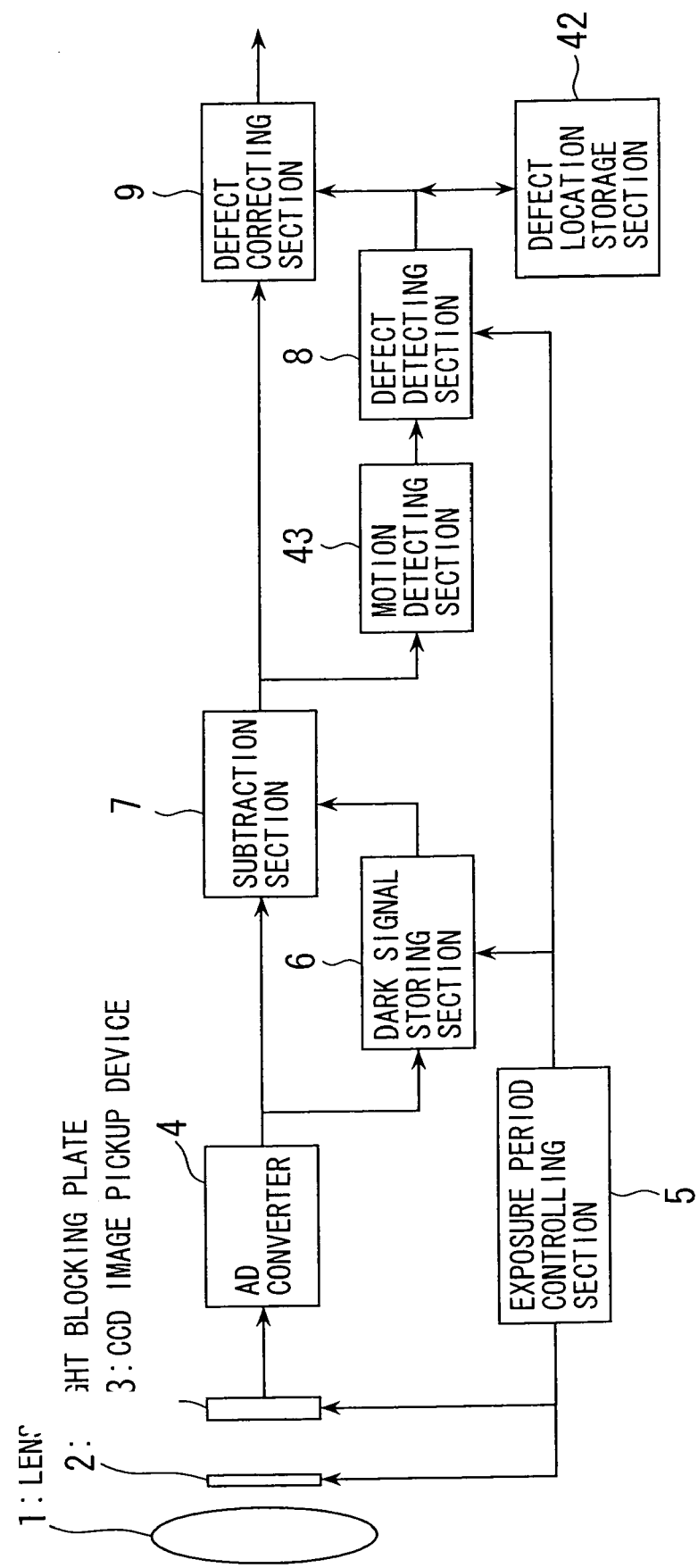
FIG. 15 is a block diagram showing a sixth embodiment of the invention.

A sixth embodiment will now be described. In the case of a frame without a motion of the object in a consecutive photographing, it is not necessary to detect defects for every frame, since changes in image do not occur. In the present embodiment, thus, a motion detecting section 43 is provided as shown in FIG. 15 so that motion is detected at the motion detecting section 43 before the performance of defect detection at the defect detecting section 8. The defect detection is performed only with respect to those frames having a motion of the object or those regions in a frame image having a motion. For those frames without a motion of the object or those regions in a frame image without a motion, on the other hand, defects are corrected by using the defect location information which has previously been obtained and stored to the defect location storing section 42.

As the technique for detecting motion at the motion detecting section 43, it suffices to use for example a block correlation technique of two frames of image (such as the technique where an image is divided into a plurality of regions and the result of averaging the signal levels is computed by each block, thereby determination is made as to whether there is a motion or not depending on how the values at the same location are different from each other between the two frames). It should be noted that, since there is an image accumulating area corresponding to one frame in the dark signal storing section 6 of the dark signal canceling section, it is also possible to use such storage section to perform the frame difference computation in obtaining the above described block correlation when the canceling of the dark signal is not performed.

The defect detection/correction operation in this embodiment will now be described by way of FIG. 16. Only when value u resulting from a normalization of the motion detection quantity obtained at the motion detecting section 43 is greater than a predetermined threshold value st, defects are detected and the defect location information is recorded at the defect location storing section 42. In other cases, correction of defects is executed on the basis of the defect location information which has already been obtained. The above described value, u, is obtained for example by a computation (difference) from the frame correlation between the frame two frames before and the frame one frame before the frame for use in the defect detection. Such value, u, can be treated either by frames or by blocks within one frame.

Figure 17:
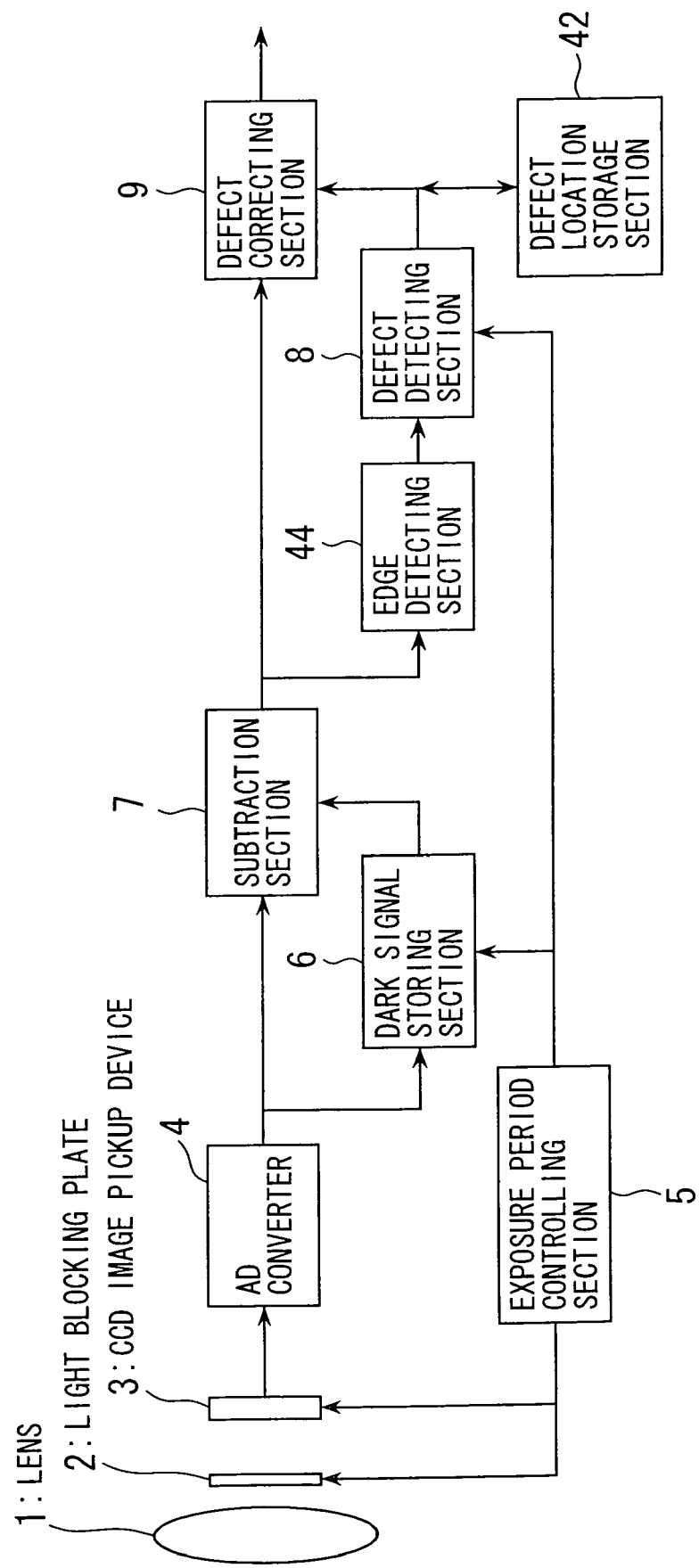
FIG. 17 is a block diagram showing a seventh embodiment of the invention.

A seventh embodiment will now be described. The accuracy of defect detection largely depends on the manner of edges contained within the image. In the present embodiment, thus, an edge detecting section 44 is provided as shown in FIG. 17 to detect edges at the edge detecting section 44 before performing defect detection at the defect detecting section 8. Defect detecting operation is then performed and the defect location information is updated only with respect to those frames having less or low-level edges or those regions within a frame image having less or low-level edges. As the technique for detecting edges by the edge detecting section 44, it suffices to use for example the technique in which a high-pass filtering is effected so that determination is made by verifying the components thereof.

While errors tend to occur in the case where defects are detected with respect to arbitrarily selected pixels within an image having many edge components, the construction according to this embodiment is capable of suppressing such effect so that defects can be accurately detected.

Figure 16:
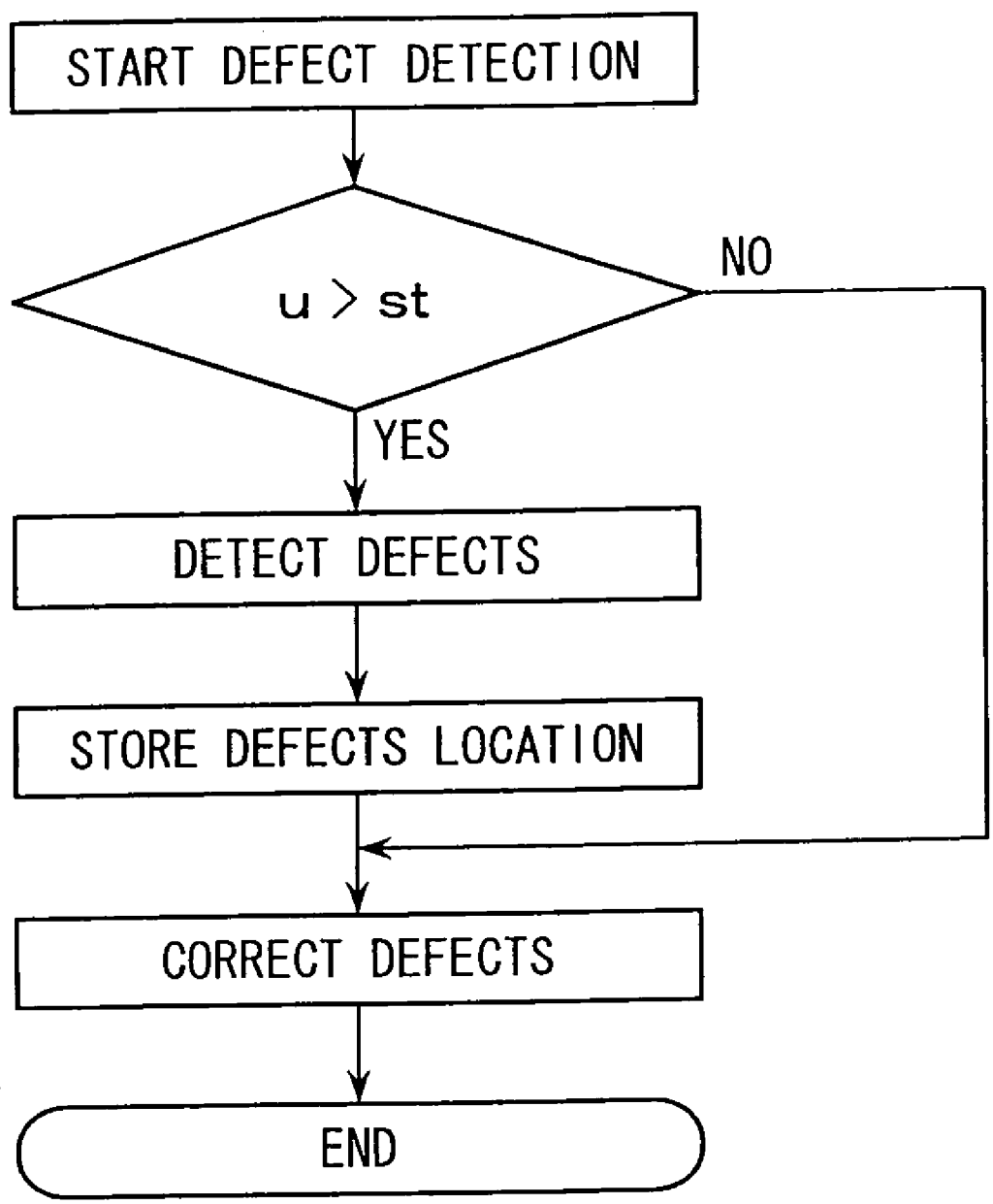
FIG. 16 is a flowchart for explaining operation of the sixth embodiment.

The operation of the seventh embodiment can be performed by equivalent steps as those in the flowchart for explaining operation related to the sixth embodiment shown in FIG. 16, by substituting a parameter obtained from normalization of a value representing the degree of image edges for the value, u, which concerns the motion detecting quantity.

An eighth embodiment will now be described. In the above described seventh embodiment, the edge detecting section 44 is provided and edges are detected at the edge detecting section 44 before detecting defects at the defect detecting section 8 so as to perform defect detecting operation only with respect to those frames (regions) having less or low-level edges. By contrast, in the present embodiment, an image having less edge components is deliberately produced on the camera side, thereby making an accurate defect detection possible.

Figure 18:
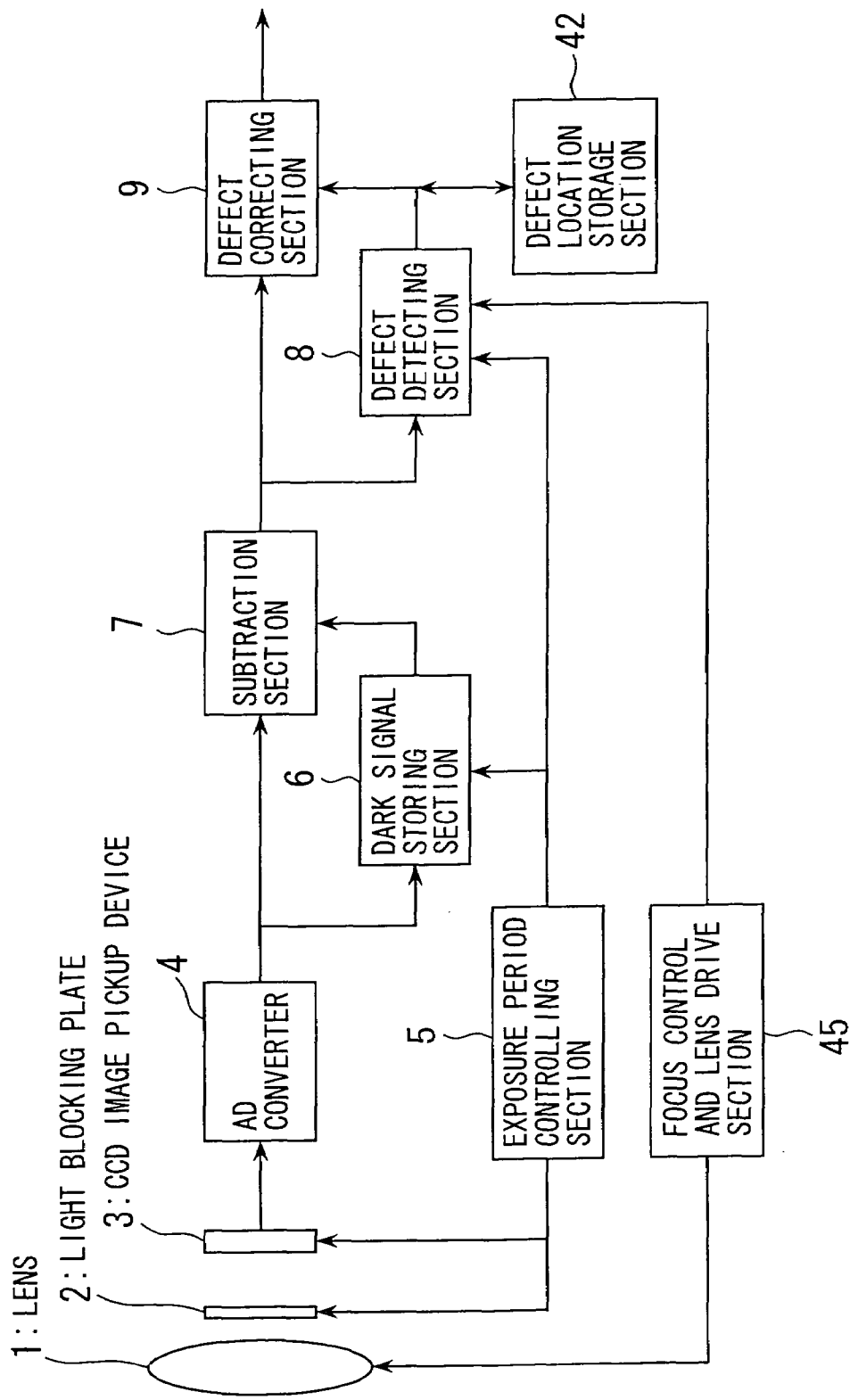
FIG. 18 is a block diagram showing an eighth embodiment of the invention.

In particular, as shown in FIG. 18, a focus control and lens drive section 45 is provided. It is provided with a defect detecting mode. When the electronic camera has entered the defect detecting mode, the focus control and lens drive section 45 is driven so that the lens is deliberately forced to be out of focus. Defects are then detected with respect to an image taken in that state and the result is stored to the defect location storing section 42. Thereafter, the defects are corrected by using such information.

While errors tend to occur in detecting defects of an image having many edge components, the detection of defects is possible at high accuracy even in the case of taking an object image having many edge components by as described deliberately producing a defocused image having less edges on the side of the camera to detect defects.

Figure 19:
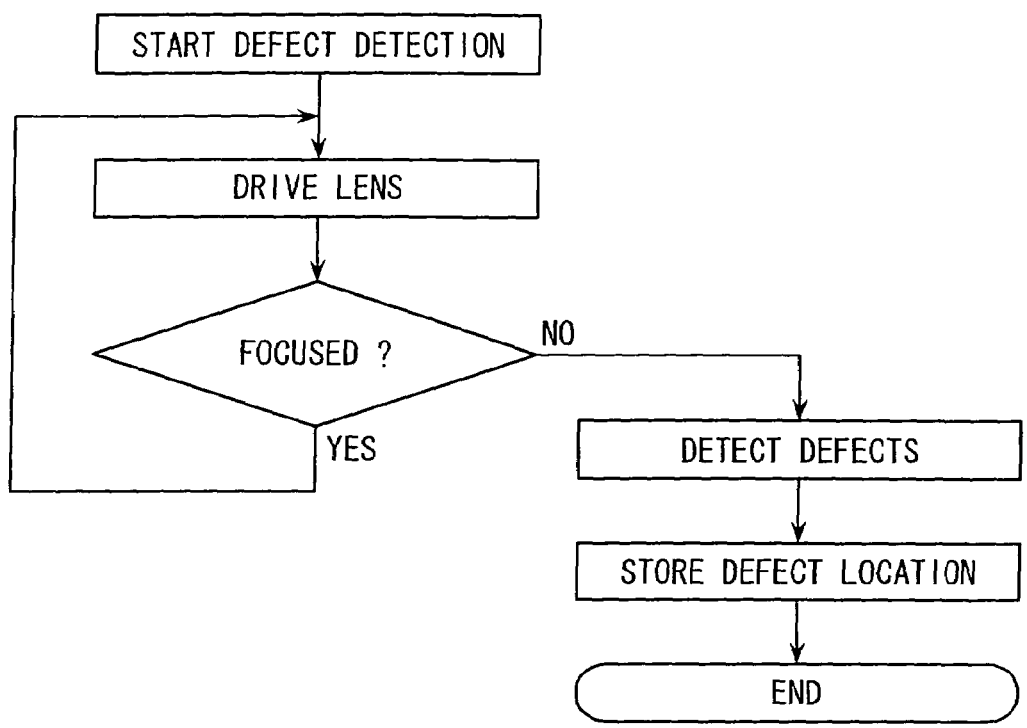
FIG. 19 is a flowchart for explaining operation of the eighth embodiment.

A flowchart for explaining the operation of this embodiment is shown in FIG. 19. The electronic camera enters the defect detection processing mode and lens 1 is driven by the focus control and lens drive section 45; and defects are detected when out of focus and the defect locations are stored to the defect location storing section 42.

A ninth embodiment will now be described. If the size of defect detection/correction processing is large and the processing speed thereof is slow, it is difficult to detect and update defects at every frame. The present embodiment has been made to deal with such condition. While its hardware construction is similar to that of the third embodiment shown in FIG. 9, the image region for which defects are to be detected is changed by each one frame so that a defect detecting result corresponding to one frame is obtained by several frames and is stored to the defect location storing section 42.

By such construction, it is possible to avoid the problems in the case where it takes time in processing the defects and the problems such as of eyesore due to the fact that defects are detected and not detected for example in taking a dynamic image.

As has been described by way of the above embodiments, it is possible according to the first and second aspects of the invention to achieve an image pickup apparatus which is capable of accurately detecting and correcting defects even in cases where the defects occur in every portion of an image for example at the time of a long time exposure. According to the third aspect of the invention, defects can be accurately detected to perform correction even under the condition of changing temperatures. It is possible according to the fourth and fifth aspects of the invention to correct defects without detecting the defects in every frame, since defects are detected by selecting predetermined frames from the image pickup signals consecutively outputted as a plurality of frames and the defects are corrected by storing the locations of the defects. It is possible according to the sixth and seventh aspects of the invention to reduce the cases where a new image taking is impossible due to a defect detection processing.

According to the eighth aspect of the invention, it is possible not to detect defects with respect to frames where motion is small, since a motion detection means is provided so that defects are detected when motion exceeds a predetermined value. It is possible according to the ninth aspect of the invention to accurately detect defects, since an edge detection means is provided so that the defects are detected only with respect to those images having relatively less edge components. According to the tenth aspect of the invention, an edge reduction means is provided so that defects can be accurately detected in a state where edges are reduced even in the case of an object having many edge components. According to the eleventh aspect of the invention, defects can be detected and updated by each frame, since a defect detecting result corresponding to one frame is obtained from several frames.

What is claimed is:

1. An image pickup apparatus comprising:
   an image pickup device;
   a storage means for previously storing the locations of fault pixels of the image pickup device;
   an edge detection means for detecting edges in image from image pickup signals outputted from said image pickup device;
   a fault pixel detection means for detecting fault pixels of the image pickup device from a frame or a region in frame having a value of edges less than a predetermined value on the basis of an output from the edge detection means; and
   a defect correction means for obtaining locations of fault pixels by adaptively switching between said fault pixel detection means and the storage means based on an output from said edge detection means so as to correct image pickup signals corresponding to the obtained locations of the fault pixels,
   wherein the edges in the image depend on data of the image.

2. The image pickup apparatus according to claim 1, wherein said fault pixel detection means detects fault pixels of the image pickup device from a frame with fewer edges or at lower level or from a region with fewer edges or at lower level within a frame of a plurality of consecutively outputted frames in accordance with an output from said edge detection means.

3. The image pickup apparatus according to claim 1, wherein said edge detection means detects image edges using high-pass filtering.

4. The image pickup apparatus according to claim 1, wherein the edges in the image are an intrinsic characteristic of the image.

5. An image pickup apparatus comprising:
   an image pickup device;
   a storage means for previously storing the locations of fault pixels of the image pickup device;
   an edge detection means for detecting edges in image from image pickup signals outputted from said image pickup device;
   a fault pixel detection means for detecting fault pixels of the image pickup device from a frame or a region in frame having a value of edges less than a predetermined value on the basis of an output from the edge detection means; and
   a defect correction means for obtaining locations of fault pixels by adaptively switching between said fault pixel detection means and the storage means based on an output from said edge detection means so as to correct image pickup signals corresponding to the obtained locations of the fault pixels,
   wherein said edge detection means detects image edges using high-pass filtering.

6. An image pickup apparatus comprising:
   an image pickup device;
   a storage means for previously storing the locations of fault pixels of the image pickup device;
   an edge detection means for detecting edges in image from image pickup signals outputted from said image pickup device;
   a fault pixel detection means for detecting fault pixels of the image pickup device from a frame or a region in frame having a value of edges less than a predetermined value on the basis of an output from the edge detection means; and
   a defect correction means for obtaining locations of fault pixels by adaptively switching between said fault pixel detection means and the storage means based on an output from said edge detection means so as to correct image pickup signals corresponding to the obtained locations of the fault pixels,
   wherein the edges in the image are an intrinsic characteristic of the image.

* * * * *